United States Patent [19]

Sturm

[11] Patent Number: 4,795,931
[45] Date of Patent: Jan. 3, 1989

[54] ASYMMETRICAL SHADED-POLE MOTOR

[75] Inventor: Gerhard Sturm, Mulfingen, Fed. Rep. of Germany

[73] Assignee: ebm Elektrobau Mulfingen GmbH & Co., Fed. Rep. of Germany

[21] Appl. No.: 54,689

[22] Filed: May 27, 1987

[30] Foreign Application Priority Data

May 28, 1986 [DE] Fed. Rep. of Germany ....... 3617989
Mar. 10, 1987 [EP] European Pat. Off. ........ 87103420.3

[51] Int. Cl.$^4$ ............................................... H02K 5/16
[52] U.S. Cl. ..................... 310/90; 310/67 R; 310/162; 310/261; 384/320; 384/476; 417/373
[58] Field of Search ............... 310/49 R, 90, 162, 166, 310/182, 197, 67 R, 163, 261, 265; 384/320, 476; 417/373

[56] References Cited

U.S. PATENT DOCUMENTS

| | | | |
|---|---|---|---|
| 3,513,339 | 5/1970 | Harris et al. | 310/90 |
| 4,219,325 | 8/1980 | Gutzwiller | 417/373 |
| 4,482,832 | 11/1984 | Minton | 310/166 |
| 4,618,791 | 10/1986 | Morrill et al. | 310/90 |
| 4,688,324 | 8/1987 | Morrill | 310/90 |

Primary Examiner—Patrick R. Salce
Assistant Examiner—D. L. Rebsch
Attorney, Agent, or Firm—Jones, Askew & Lunsford

[57] ABSTRACT

Asymmetrical shaded-pole motor (1) with a stator (2) consisting of a laminated core is formed from a C-shaped yoke, between whose free yoke prongs (7, 8), a yoke stay (4) is inserted, on which a main winding sits. A short-circuited auxiliary winding (9) is provided in the leg connecting the yoke prongs, and in a recess in this leg, there is a laminated squirrel-cage rotor (3) with a small air gap to the stator (2), mounted so it can rotate on a motor shaft (17). The squirrel-cage rotor (3) is designed as a hollow cylinder and directly surrounds coaxially a bearing supporting tube (13) that is connected to the stator (2) and projects into its interior from the open end, such that the motor shaft (17) is guided by bearings (14) in it, and is connected to the rotor (3) on the end opposite the bearing supporting tube (13).

8 Claims, 4 Drawing Sheets

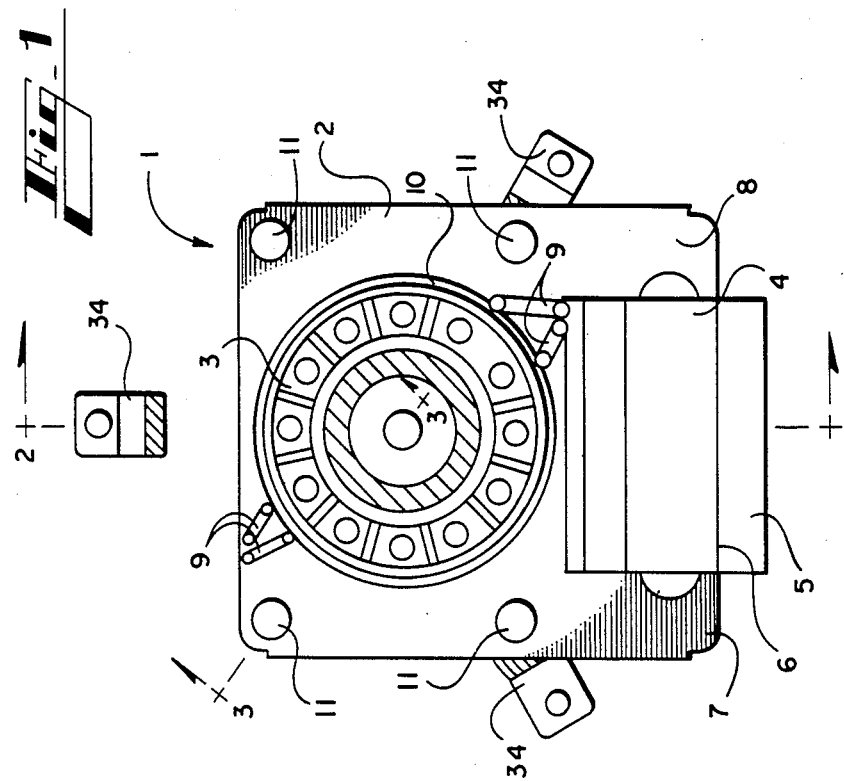
Fig_1
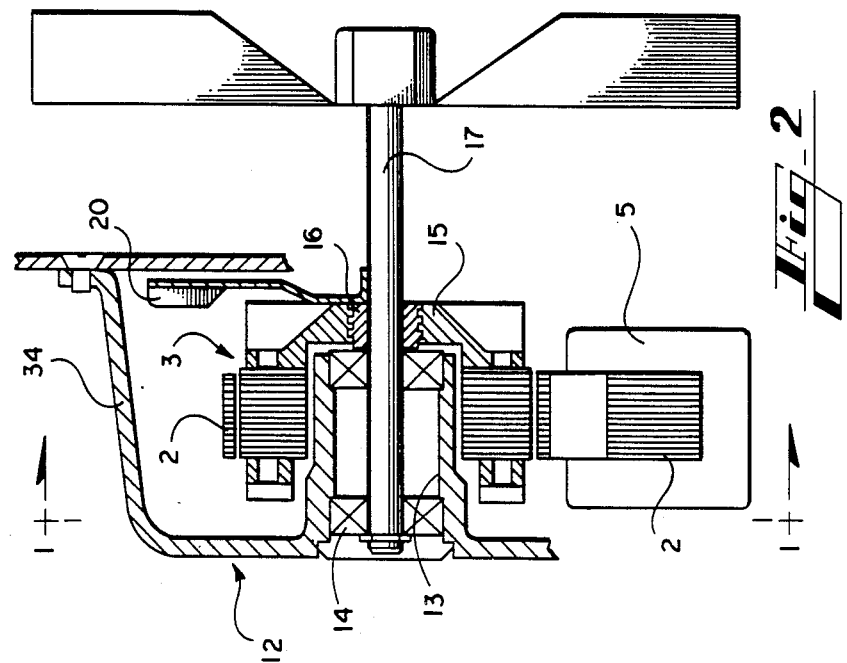
Fig_2

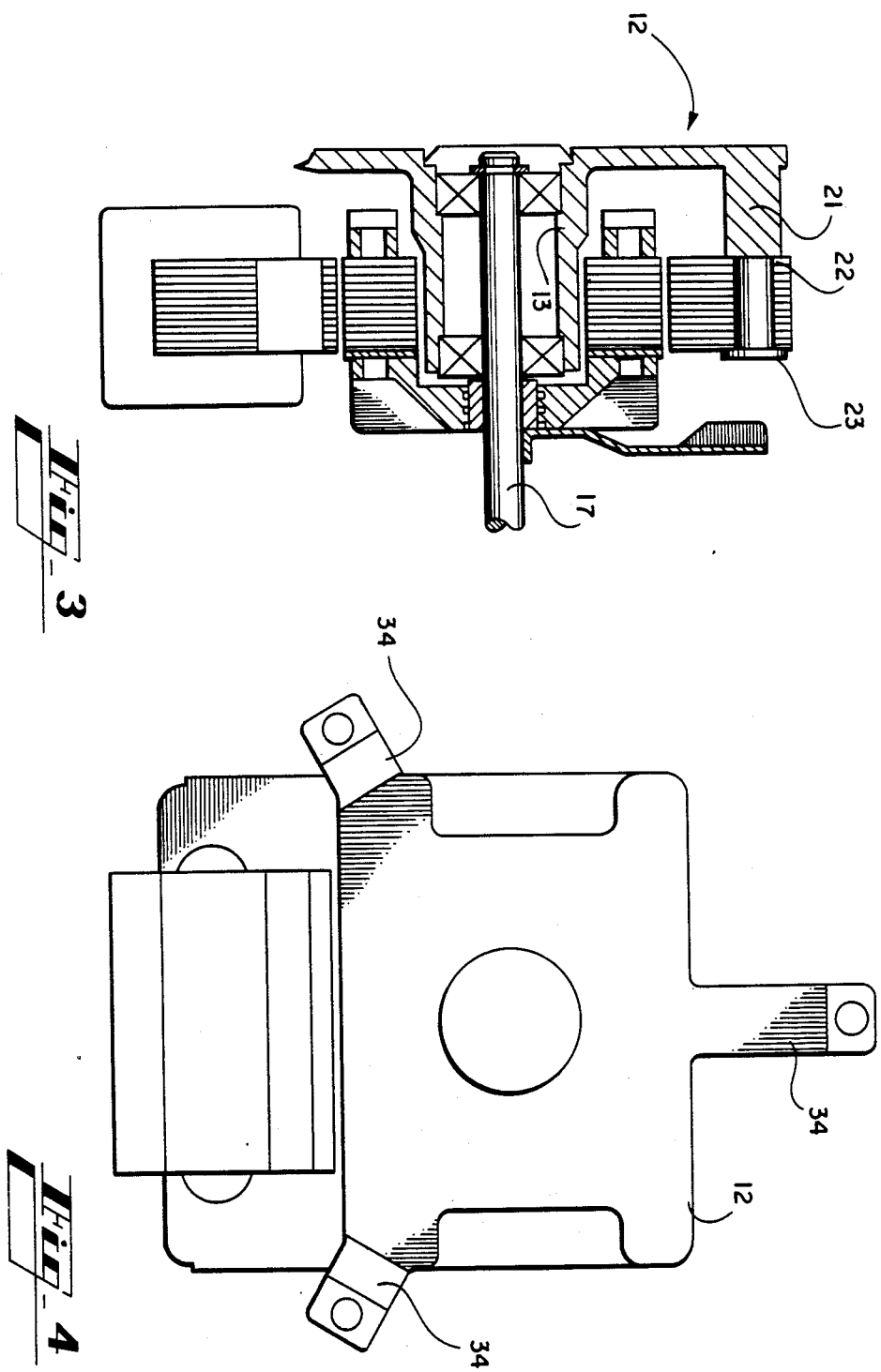

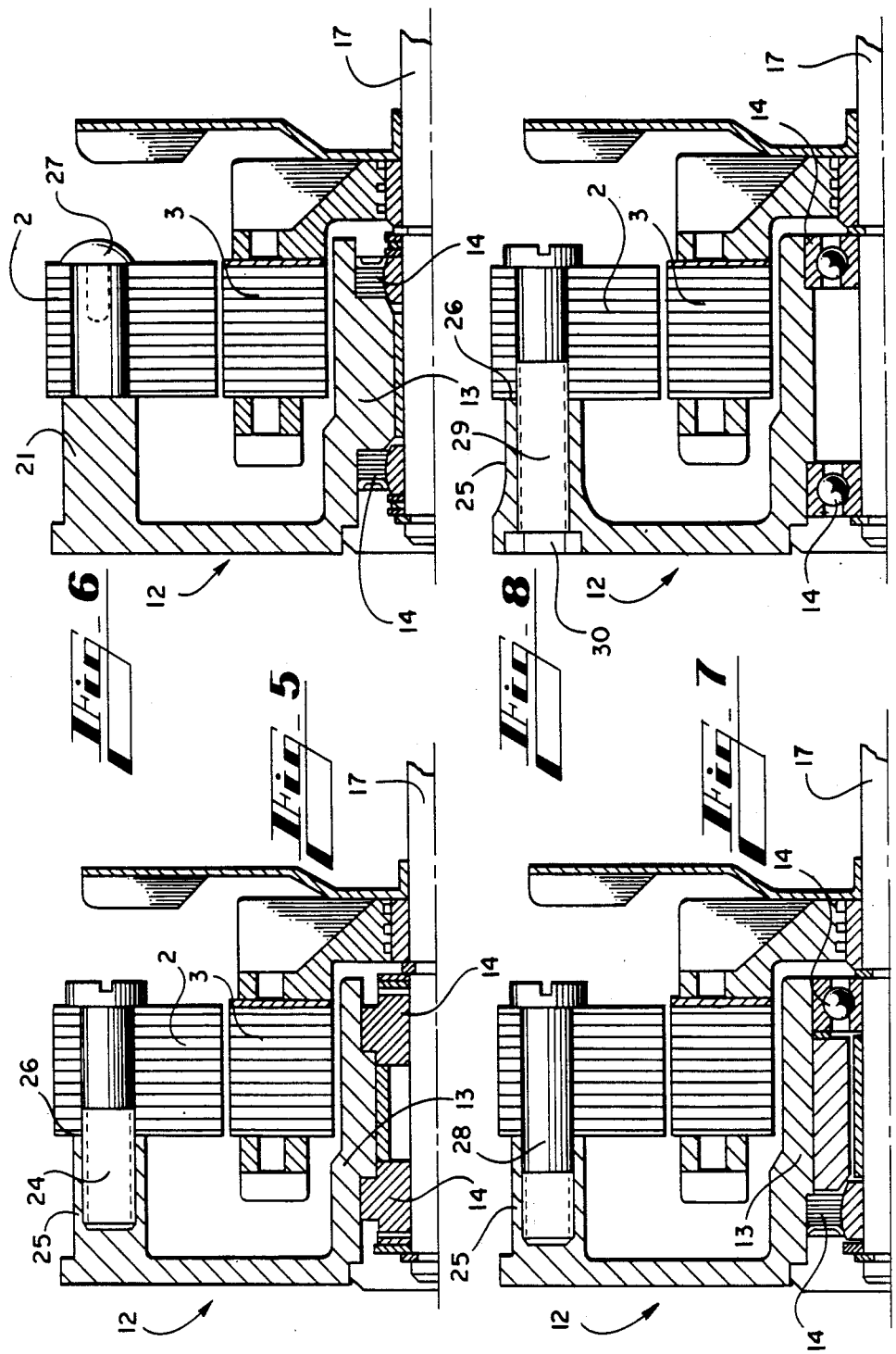

ASYMMETRICAL SHADED-POLE MOTOR

The present invention concerns an asymmetrical shaded-pole motor with a stator of a laminated core formed by a C-shaped yoke, between whose free prongs a yoke stay is inserted on which a main winding sits, and in the legs of the C that connect the prongs, there is a short-circuited auxiliary winding, and in a recess in this leg, there is a laminated squirrel-cage rotor with a small air gap to the stator mounted on a motor shaft, so it can rotate.

Such a motor is already known from German Patent (OLS) No. 3,246,595, where the shaft of the rotor is accommodated in a borehole in the center of the rotor plates. An end shield with integrated bearing elements screwed to each end of the stator core serves to fix the rotor that is mounted on the shaft to the stator core. With this arrangement of shaft and bearing, the diameter of the rotor is relatively small, and the axial length of the motor is increased excessively by the end shields placed on the ends. For example, a fan wheel may be mounted on the shaft of the rotor. With such known motors as described initially, the problem occurs that in the case of heating of the rotor shaft due to external influences, an extremely high thermal load acts on the bearing, which can lead to failure of the bearing and thus of the motor. These problems especially occur with motors used to drive fan wheels which are part of hot air blowers in baking, grilling or frying equipment. Due to the heating of the fan wheel, there is a heat flow which starts from the fan wheel and leads over the shaft, the bearing and the end shields to the stator iron core. This heat flow over the bearing elements can cause decomposition of the oil or grease. In the extreme case, this can lead to dry running and thus to destruction of the bearing, but at least to a significant reduction in the lifetime of the bearing. Friction bearing designs are especially susceptible in this regard.

This thermal load is not such a problem with ball bearing designs as with friction bearings, but with ball bearings, the lack of possibility of adjusting the motor shaft has an effect. Since there is always a radial offset of the shaft due to the end shields attached to the ends of the stator iron core and bolted there, the result is a misalignment between the two end shields which cannot be compensated by the ball bearings and therefore reduces the lifetime of the bearings. Another disadvantage of these known internal rotor motors is that imbalance problems of parts mounted on the shaft are manifested noticeably due to the relatively low mass of the rotor. This also has the effect of reducing the lifetime of the motor bearings.

The present invention is based on the problem of improving an asymmetrical shaded-pole motor of the type described initially in such a way that reliable bearing of the motor shaft is achieved without misalignment, improved dissipation of heat from the bearing area is achieved, and imbalance caused by parts driven by the motor shaft can be compensated better, thus yielding a very smooth running motor. Furthermore, the purpose of the present invention is also to create a structurally simple compact motor design that can be manufactured inexpensively with the same volume of iron in the yoke at the same power level as with known shaded-pole motors.

According to this invention, this is achieved by the fact that the squirrel-cage rotor is designed as a hollow cylinder and coaxially surrounds a bearing supporting tube that is connected to the stator and projects into the interior of the squirrel-cage rotor from its open end such that the motor shaft is guided in bearings in the bearing supporting tube and is connected to the rotor on the end opposite the bearing supporting tube. According to this invention, a motor is thus created which can be called an intermediate rotor motor, because the rotor is located so that it rotates between the bearing supporting tube of the stator and the stator iron core. This invention is based on the surprising finding that despite the larger diameter of the rotor in comparison with rotors of the known asymmetrical shaded-pole motors of the same power, the iron volume remains unchanged, and this even yields the additional effect that the entire motor has a shorter structural length than motors of the usual design of the same power. Due to the design according to this invention, it is possible for the motor flange to be accommodated on the outside surface of the bearing supporting tube in machining the bearing borehole, and machining of both sides of the bearing seats in the interior of the bearing supporting tube is possible. This prevents misalignment of the two bearings, which has a negative effect on the lifetime of the ball bearing. Heat transmission from the shaft to the bearing elements is also largely dissipated. This results from the fact that the rotor is mounted in front of the bearings as seen in the axial direction, and thus serves as a so-called heat sink for diverting the resultant temperature increases over the rotor. This diversion is also promoted by the fact that the rotor can be designed relatively large in its radial dimensions and thus in its mass, because of the fact that the bearing supporting tube is accommodated in its interior. Due to the mounting of radial stays on the outside of the rotor bottom at the sides, additional diversion of heat is achieved which is impossible with the known internal rotor motors. Due to the increase in the size of the rotor as well as the associated increase in rotor mass, there is also the advantage that unbalanced masses acting on the shaft, e.g., due to an unequal distribution of mass of a driven fan wheel mounted on the shaft, do not act on the bearing elements to the same extent as is possible with traditional asymmetrical shaded-pole motors.

Electric motors are already known from German Patent (OLS) No. 2,102,679 and U.S. Pat. No. 2,234,571 where they have a can-shaped stator housing, on whose periphery the stator core is mounted with the stator winding, and a bearing sleeve projects inward from the central part of the housing, and inside there is a bearing body for the motor shaft on which the rotor is mounted, and the bearing sleeve projects into the rotor body. In these motors, the stator core section is symmetrical in design. However, the problem with this design is that the winding process is relatively expensive and specifically the windings can be produced only by relatively complicated winding methods, e.g., by means of needle winders.

U.S. Pat. No. 3,256,453 describes a synchronous motor for use in electric clocks, etc., whereby a permanent magnetic rotor is mounted so it can rotate about a bearing shoulder of the stator where the stator itself is made of a magnetizable material. This rotor is not suitable for driving hot air equipment, for example, because here the motor shaft projects out of the stator on the end opposite the rotor so the bearing area is exposed directly to the influence of heat. In addition, the section holding the bearing projects far out of the stator on the side facing away from the rotor so the design length is increased and the bearing is not enclosed by the rotor but instead is outside the actual motor.

This invention will now be explained in greater detail with reference to the practical examples illustrated in the accompanying diagrams.

FIG. 1 shows a top view of a motor according to this invention with its stator iron core and its rotor according to sectional line 1—1 in FIG. 2.

FIG. 2 shows a section along line 2—2 in FIG. 1.

FIG. 3 shows a section along line 2—3—3 in FIG. 1.

FIG. 4 shows a top view of a motor flange according to this invention.

FIGS. 5 to 8 show views along line III—III in FIG. 1 with various practical examples for the bearing and mounting of the stator iron core.

Figure 9:
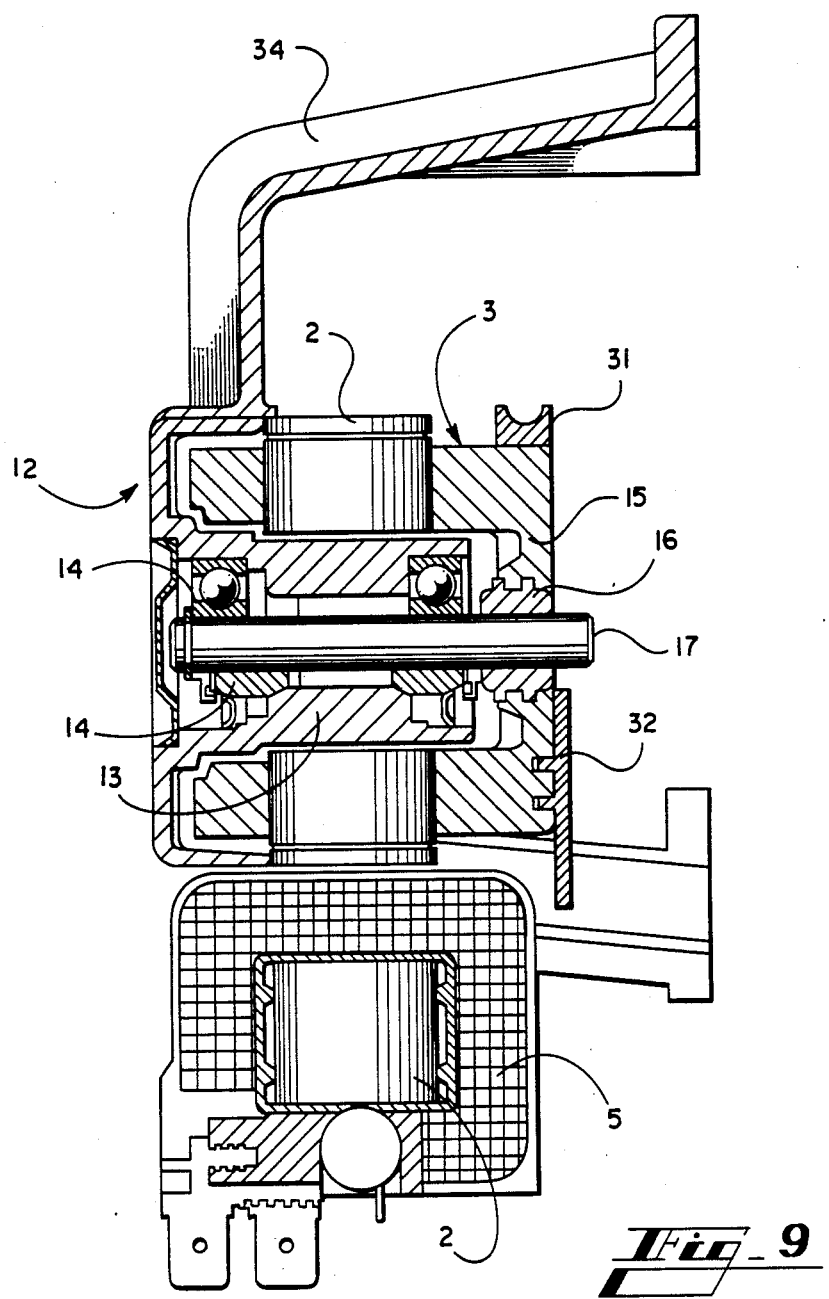
FIG. 9 shows a section through two alternative versions of the motor according to this invention (top half, bottom half).

FIG. 1 shows an asymmetrical shaded-pole motor 1 according to this invention. This shaded-pole motor consists of a dynamo core as stator 2 and a rotor 3. The view illustrated in FIG. 1 shows the shaded-pole motor 1 according to this invention as seen from the motor flange side. Rotor 3 is likewise made of a laminated core consisting of individual laminations. Stator 2 and rotor 3 are produced by the so-called armature stamping method on the basis of the design of the shaded pole motor 1 according to this invention. The stator has a C-shaped design, and its yoke stay 4 is designed as a separate part, so it is removable. This provides the possibility of economical manufacture of an exciting coil 5 (main winding) placed on the yoke. Exciting coil 5 can be wound on a coil former when the yoke stay is removed, namely on a coil former 6 that has been slipped onto the yoke. After wrapping the yoke stay 4 with the exciting coil, yoke stay 4 can be secured between the two yoke prongs 7 and 8 of stator 2 by pressing it in position. In addition, stator 2 has auxiliary windings 9 which may be made of bare short-circuited copper windings. Auxiliary windings 9 are diagonally opposed on the periphery of the opening 10 in stator 2 that holds rotor 3. Preferably four boreholes 11 are provided in stator 2, arranged at the corners of a rectangle, especially a square with the axis of rotation of rotor 3 passing through its midpoint.

As FIG. 2 indicates, motor flange 12 which serves to secure the motor is provided with a bearing supporting tube 13 in which case the bearing supporting tube 13 is preferably in one piece with motor flange 12. This bearing supporting tube 13 runs coaxially with motor 3 which surrounds the bearing supporting tube 13 and preferably holds it completely. According to this invention, rotor 3 is designed in a cup shape, so bearing supporting tube 13 projects from the open side of rotor 3 into it. Bearings 14 are provided in bearing supporting tube 13, preferably in each end area of bearing supporting tube 13. These bearings 14 may consist of ball bearings, friction bearings or a combination of the two. Due to the one-piece design of motor flange 12 and bearing supporting tube 13, the bearing seats for the bearings 14 can be machined from the inside in such a way as to practically rule out the possibility of misalignment between the two bearing bodies. To do so, the bearing supporting tube 13 attached to motor flange 12 is clamped on its outside and machined simultaneously on the inside, i.e., on both sides.

The hollow cylindrical rotor 3 has a bottom 15 with a bushing 16 on the end opposite the bearing supporting tube so rotor 3 is joined in a nonpositive fit with shaft 17. As already explained, rotor 3 consists of individually laminated core plates. In the motor according to this invention, these are joined to each other and to short-circuit rings at the faces by means of a short-circuit winding made of aluminum or an aluminum alloy, as is already known per se. The bottom 15 of rotor 3 is preferably completely closed and may have cooling ribs on the outside. As an alternative, it may also be made of radial stays between which the rotor bottom has apertures to improve cooling of the bearing elements. As illustrated in FIG. 2, an additional cooling wheel 20 may also be provided on shaft 17 outside the motor according to this invention in cases where the thermal loads are especially high. Shaft 17 is mounted in a known way in the interior of bearing supporting tube 13. A fan wheel, e.g., for a hot air circulation system, can be mounted on the extended end of the shaft facing the outside of bottom 15.

Due to the design of motor 1 according to this invention where the bearing is accommodated inside rotor 3, there is an excellent dissipation of heat over the rotor to the outside due to the increase in size of the rotor radially as well as the resultant increase in mass. This largely prevents thermal stress on the bearing elements. Furthermore, due to the design according to this invention, an increase in moment of inertia is achieved, and in balanced motors, this assures a very smooth running motor. Furthermore, any residual imbalance that might be present, e.g., of a fan wheel 33 mounted on the shaft, has only a minor effect on the smooth running of the motor, due to the increased moment of inertia of the rotor. Boreholes distributed uniformly in circumferential direction may be provided on both ends of the rotor to balance it.

As shown in FIG. 3, stator 3 is mounted on motor flange 12 by means of pins 21. These pins 21 run through boreholes 11 of stator 2, whereby the iron core forming stator 2 is pushed as far as a stop 22 on pin 21. As FIG. 3 also indicates, the end of pin 21 is flanged after positioning stator iron core, thus forming a flanged edge 23 which holds together the stator iron core. Due to this type of securing of the stator iron core according to this invention, it is possible to prefabricate it according to the armature stamping method. No additional measure such as welding, bolting, etc., is necessary to hold the individual plates of the stator iron core together.

FIGS. 5 to 8 show other versions of the securing of the stator iron core.

FIG. 5 shows a method of securing the ion core that forms stator 2 by means of threaded bolts 24, whereby the threaded bolts 24 are screwed into hollow cylinder projections 25 of motor flange 12 that have a matching internal thread. Cylinder projections 25 are provided with a peripheral shoulder 26 on their free ends projecting into the borehole in the stator iron core for the purpose of centering and also as an assembly aid for the iron core of the stator. The bearing bodies 14 may be designed as friction bearings, for example.

FIG. 6 shows a method of securing the stator iron core with the help of hollow rivets 27. These hollow rivets are riveted into the free ends of pins 21. These hollow rivets 27 in turn serve to hold the stator iron core together and to secure it. Bearings 14 may be designed as cup bearings, for example. Instead of hollow rivets, solid rivets may also be used.

FIG. 7 shows a method of securing the stator iron core which consists of a bolt 28 that has a thread only in the front area and is otherwise cylindrical in shape. The cylindrical area is longer than the height of the stator iron core so the bolt 28 projects with its cylindrical area out of the stator iron core, and the cylindrical area is also held by the borehole of projection 25 which is why projection 25 has a thread only in its lower area. The outside diameter of the cylindrical area of bolt 28 is only slightly smaller than the inside diameter of boreholes 11 in the stator iron core. Due to the design according to this invention, the stator is centered already when bolts 28 are inserted. The end of cylinder projection 25 serves as a stop for the stator iron core, so the stator iron core is held between the head of the bolt and this end. The bearing of shaft 17 may consist of a combination of friction bearing, especially cup bearing, and ball bearing. In this case, the friction bearing is on the end facing motor flange 12, and the ball bearing is on the opposite end.

FIG. 8 shows another practical example for securing the stator iron core, namely by means of a bolt with a nut, where the nut is inside the motor flange. In this version, the cylinder projection 25 has a centering shoulder 26 which engages boreholes 11 of the stator iron core. Cylinder projection 25 has a continuous borehole to receive bolt 29. The bearing of the shaft is provided by ball bearings. FIG. 4 shows a view of a motor according to this invention as seen from the side of motor flange 12. The practical example shown here is used as a hot air fan. Therefore motor flange 12 has three curved mounting arms 34 supported on a rear wall of a device (not shown). The motor flange is preferably made of die cast aluminum if there is to be an elevated thermal load, e.g., when used for hot air fans. For other applications, it can also be made of suitable plastic materials.

FIG. 9 shows two other versions of a motor according to this invention. In the top half, the basic design of the bearing corresponds to the version described in FIG. 8. In the practical example shown here, a belt pulley 31 is mounted on rotor 3. By means of this belt pulley, the motor according to this invention may serve as a drive unit. The belt pulley may also be designed in one piece with rotor 3.

The lower half of FIG. 9 shows a version where a pulse generator disk 32 is mounted on the end of rotor 3. The bearing in FIG. 9, lower half, corresponds essentially to the version shown in FIG. 6.

The two versions shown here are possible because, according to this invention, the rotor is freely accessible on the side facing away from motor flange 12 and thus can be used for a wide variety of driving, measurement and display purposes. It is also within the scope of this invention to provide external teeth on the outside of the rotor so the rotor can be part of a gear transmission drive.

It is also within the scope of this invention for motor shaft 17 to also be extended outside beyond motor flange 12.

The same parts in FIGS. 1 to 9 are labeled with the same numbers.

The present invention is not limited to the practical examples described here, but instead includes all versions that have the same effect in the sense of this invention. In comparison with known asymmetrical shaded-pole motors, the motor according to this invention has an elongated leg length or prong length of the laminated stator at the same power rating, but it yields a greatly reduced thickness of the iron core, so a very flat design is achieved. This is based on the finding that the motor according to this invention does not require any increase in iron volume in comparison with known asymmetrical shaded-pole motors of the same power level, although the rotor according to this invention has a larger diameter in comparison with rotors of the same power of known shaded-pole motors.

I claim:

1. An asymmetrical shaded-pole motor comprising a stator of a laminated core formed from a C-shaped yoke between whose free yoke prongs a yoke stay is pressed in, a main winding being situated on said yoke stay, a short-circuited auxiliary windings being provided in a leg of said core joining said yoke prongs, a laminated squirrel-cage rotor being rotatably mounted by means of a motor shaft in a recess of said leg with a small air gap to said stator, wherein:

said squirrel-cage rotor is cup-shaped to comprise a hollow cylinder having a bottom at one end and beign open at the other end;

said motor shaft extending in an axialy direction through a central opening in said bottom and being coupled with said rotor in the area of said central opening;

a hot air fan wheel mounted on the extended end of said shaft projecting outside of said bottom;

a motor flange to which said stator is secured;

said flange being in one piece with a bearing support tube;

said bearing support tube extending from the open end of the rotor into the inside of said hollow cylinder rotor, so that said rotor directly and coaxially surrounds said bearing support tube;

bearing guiding the other end of said motor shaft opposite said hot air fan wheel; and said bearings being located within said bearing support tube, whereby the rotor serves as a heat sink for transferring heat from the shaft to the rotor and away from the bearings, and the air stream from the fan dissipates the heat.

2. Asymmetrical shaded-pole motor according to claim 1, wherein the rotor comprises a squirrel-cage rotor with an aluminum cage.

3. Asymmetrical shaded-pole motor according to claim 1, wherein the rotor bottom as a sleeve in which the motor shaft is guided in a onpositive fit.

4. Asymmetrical shaded-pole motor according to claim 1, wherein the laminated ore of the stator is secured to the motor flange by means of at east one mounting device.

5. Asymmetrical shaded-pole motor according to claim 4, wherein the mounting device comprises several pins that pass through boreholes in the stator and have free ends that hold the stator.

6. A shaded-pole motor according to claim 1, wherein said bottom of said rotor is closed, and cooling means form the group consisting of cooling ribs and an additional fan wheel are provided on the outside of said bottom in the direction of said hot air fan wheel, so as to dissipate heat from the rotor.

7. Asymmetrical shaded-pole motor according to claim 1, wherein the bearings are selected from the group consisting of ball bearings friction bearings.

8. A shaded-pole motor according to claim 1, wherein said bottom of said rotor is made of radial stays between which are apertures in said rotor bottom, so as to aid in cooling the motor.

* * * * *